US006717948B1

(12) United States Patent
Subbiah (10) Patent No.: US 6,717,948 B1
(45) Date of Patent: Apr. 6, 2004

(54) KNOWLEDGE-BASED CONNECTION ADMISSION METHOD AND APPARATUS FOR PROVIDING EFFICIENT MULTIPLEXING OF DATA AND SPEECH OVER AAL2

(75) Inventor: Baranitharan Subbiah, Chelmsford, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/126,835

(22) Filed: Jul. 30, 1998

(51) Int. Cl.[7] .............................................. H04L 12/56
(52) U.S. Cl. ................................ 370/395.64; 370/395.1
(58) Field of Search ............................ 370/385, 395.01, 370/474, 493, 494, 495, 395.6, 395.64

(56) References Cited

U.S. PATENT DOCUMENTS

| | | | | | |
|---|---|---|---|---|---|
| 5,506,848 | A | * | 4/1996 | Drakopoulos et al. ...... | 370/95.1 |
| 5,802,051 | A | * | 9/1998 | Petersen et al. ............ | 370/395 |
| 6,128,659 | A | * | 10/2000 | Subblah et al. ............. | 709/225 |
| 6,172,971 | B1 | * | 1/2001 | Kim ........................... | 370/342 |
| 6,229,821 | B1 | * | 5/2001 | Bharucha et al. ........... | 370/471 |
| 6,266,323 | B1 | * | 7/2001 | Valko et al. ................. | 370/230 |

FOREIGN PATENT DOCUMENTS

GB     2 299 250 A     9/1996

OTHER PUBLICATIONS

Hoeller, J., "Voice And Telephony Networking Over ATM", Ericsson Review, No. 1, Jan. 1998, pp. 40–45, XP000734508.

Elhakeem et al., "Analysis Of A New Quality Congestion Control Policy For An ATM Based ISDN", IEICE Transactions On Communications, vol. E75–B, No. 3, Mar. 1992, pp. 193–206, XP000301164.

(List continued on next page.)

*Primary Examiner*—Kenneth Vanderpuye
(74) *Attorney, Agent, or Firm*—Squire, Sanders & Dempsey L.L.P.

(57) ABSTRACT

A knowledge-based connection admission method is disclosed for efficient multiplexing of data and speech over AAL2. The method uses a knowledge-based technique to decide when and what type of data traffic will be multiplexed with speech traffic in ATM Adaptation Layer 2 (AAL2) environment. The knowledge-based connection technique supports low bit rate and delay sensitive applications such as mobile telephony in an ATM environment by maximizing the use of available bandwidth. The method includes monitoring ATM cells for a AAL2 connection, determining whether the ATM cells contain unused bytes and multiplexing data traffic with speech traffic on the AAL2 connection when the data meets a predetermined set of requirements. The method determines whether the data traffic requires a bandwidth that exceeds a bandwidth provided by the unused bytes and multiplexes the data traffic with the speech traffic when the bandwidth required by the data traffic does not exceeds the bandwidth provided by the unused bytes and prevents the multiplexing of the data traffic with the speech traffic when the bandwidth required by the data traffic exceeds the bandwidth provided by the unused bytes. The unused bytes represent silence periods during speech traffic. System observations are gathered and processed with prior knowledge about the system. Based upon the processing, whether the data traffic is suitable for multiplexing with speech traffic is determined and the data is multiplexed with the speech traffic when the data traffic is determined to be suitable for multiplexing with speech traffic in the unused bytes of the speech ATM cells.

35 Claims, 6 Drawing Sheets

OTHER PUBLICATIONS

Heidelberger et al., "Fast Simulation Of A Voice–Data Multiplexer", Proceedings of Infocom '95 —Conference on Computer Communications, Fourteenth Annual Joince Conference of the IEEE Computer and Communications Societies, Boston, Apr. 2–6, 1995, vol. 3, No. Conf. 14, Apr. 2, 1995, pp. 361–368, XP000580599, IEEE ISBN: 0–7803–2524–9, section 3, 4.

Nagata et al., "Evaluation Of AAL–2 For Low–Bit–Rate ATM Voice Communications", NTT Review, vol. 10, No. 1, Jan. 1, 1998, pp. 72–80, XP000729761.

Giarratano, J. et al., "CLIPS User's Guide", Version 6.10, pp. i–vii, and 1–154 (Aug. 5, 1998).

International Telecommunication Union, "ITU–T G.729 General Aspects of Digital Transmission Systems: Coding of Speech at 8 kbit/s Using Conjugate–Structure Algebraic–Code–Excited Linear–Prediction (CS–ACELP)", 38 pages, (Mar. 1996).

International Telecommunication Union, "ITU–T, I.363.2 Series 1: Integrated Services Digital Network: Overall Network Aspects and Functions—Protocol Layer Requirements: B–ISDN ATM Adaptation Layer Specification: Type 2 AAL"pp. i–iii and 1–43, (Sep. 1997).

International Telecommunication Union, "ITU–T, 1.366.1 Series 1: Integrated Services Digital Network Overall Network Aspects and Functions—Protocol Layer Requirements: Segmentation and Reassembly Service Specific Convergence Sublayer for the AAL Type 2", pp. i–iii and 1–43, (Jun. 1998).

McLoughlin, M. et al., "A Management Briefing on APEX Voice Service Module Product Overview", copyright by General DataComm, pp. 1–18, (1997).

Subbiah, B. et al., "Low Bit Rate Voice Telephony Over ATM—Issues and Strategies", *Submitted to IEEE Communications Magazine*, 14 pages (date unknown).

\* cited by examiner

KNOWLEDGE-BASED CONNECTION ADMISSION METHOD AND APPARATUS FOR PROVIDING EFFICIENT MULTIPLEXING OF DATA AND SPEECH OVER AAL2

BACKGROUND OF THE INVENTION

1. Field of the Invention.

This invention relates in general to a network communications, and more particularly to a knowledge-based connection admission method and apparatus for providing efficient multiplexing of data and speech over AAL2.

2. Description of Related Art.

ATM has been selected as a world standard for broadband ISDN in network communication systems. ATM systems have been implemented on a global basis and developed in a rapid growth. ATM technology is destined to play a major role in both public and private broadband networks. AAL2 is one of the four types of AAL (ATM Adaptive Layer) protocols which have been recommended by CCITT (now ITU-T), namely AAL1, AAL2, AAL3/4 and AAL5. In general, the layer services provided by AAL1 are constant bit rate (CBR) services which require information to be transferred between source and destination at a constant bit rate. AAL2 offers a transfer of information with a variable bit rate. In addition, timing information is transferred between source and destination. Since the source is generating a variable bit rate, it is possible that cells are not completely filled and that filling level varies from cell to cell. AAL3/4 is used for transfer of data which is sensitive to loss, but not sensitive to delay. The AAL3/4 protocol may be used for connection oriented as well as for connectionless data communication. AAL3/4 itself does not perform all functions required by a connectionless service, since functions like routing and network addressing are performed on the network layer. AAL5 is designed to offer a service with less overhead and better error detection below the common part of the convergence sublayer (CPCS).

The AAL2 signaling protocol describes methods by which a switched AAL2 connection can be established between two AAL2 end users across a network that consists of both ATM and AAL2 switches. The important function of AAL2 signaling protocol is to establish an AAL2 connection between two AAL2 end points on a concatenation of ATM Virtual Channel Connections (VCCs) that are either on demand (SVC) or semi-permanent (PVC). Some the basic requirements of AAL2 signaling protocol include the ability to establish an AAL2 connection between AAL2 end systems that support AESA formats, the ability to support hop-by-hop routing mechanism between AAL2 end systems, the ability to indicate any failures to corresponding management entity, and the ability to setup AAL2 connections with different Quality-of-Service (QoS) requirements. In AAL2, packets (minicells) from many users are assembled into a single ATM cell and transmitted on the same ATM connection. In addition, packets are allowed to straddle across ATM cell boundary to maximize the bandwidth utilization.

The success of ATM in wireline network has given impetus to the wireless network operators to adopt ATM for efficient use of network resources and able to support growing demands for different services. With AAL2, low bit rate and delay sensitive applications, such as mobile telephony, share a common ATM VCC thus increasing statistical multiplexing efficiency. Bandwidth efficiency, due to AAL2 for delay sensitive speech traffic, has been confirmed by simulation studies and commercial products available today.

The AAL2 standard consists of Common Part Sublayer (CPS) and Segmentation and Reassembly Service Specific Convergence Sublayer (SAR-SSCS ). The CPS standard describes the procedures involved in multiplexing packets from different users on a single ATM VCC and the SAR-SSCS standard specifies ways to carry packets that are larger than 64 bytes in AAL2.

The procedure involved in transmitting data over AAL2 is similar to AAL5. A data packet received from a user is added 8 byte Service Specific Transmission Error Detection Sublayer (SSTED) trailer similar to AAL5 trailer. Even though, SAR-SSCS specification describes three different ways to transmit a data packet, the SSTED trailer is added to obtain similar services offered by AAL5. The main difference between AAL5 and AAL2 is the padding, which is not needed in AAL2. If the size of a data packet is larger than 64 bytes then it is segmented into multiple of 64 bytes. Each segment is converted into CPS-Packet with a 3 byte header and passed to the CPS layer for AAL2 multiplexing. The CPS layer assemble these minicells in ATM cells and transmit them to remote AAL2 peer entity. The maximum size of a data packet is limited to 65535 octets in SAR-SSCS.

Recently, there has been considerable interest in multiplexing best effort data traffic along with speech to achieve the maximum bandwidth efficiency in the output ATM link. However, with current multiplexing method and apparatus, speech and best effort data traffic are separated, with one VCC handling one type of traffic and a second VCC utilizing another AAL standard for handling another type of traffic, i.e., different Quality of Service. If there are not ATM cells to transmit from the first VCC, then ATM cells from the second VCC will be transmitted automatically. This is a standard procedure implemented in ATM switches that are available today.

Nevertheless, AAL2 introduces a situation where the leftover bandwidth in one of the VCCs may not be used for any best effort data traffic. This may lead to ATM cells in one of the VCCs being partially filled resulting in in-efficient bandwidth utilization. Thus, potentially available bandwidth can not be used by any other traffic that passes through the ATM switch.

It can be seen that there is a need for a connection admission method and apparatus that uses knowledge-based techniques to decide when and what type of data traffic will be multiplexed with speech traffic in ATM Adaptation Layer 2 (AAL2) environment.

It can also be seen that there is a need for a connection admission method and apparatus that supports low bit rate and delay sensitive applications such as mobile telephony in an ATM environment.

It can also be seen that there is a need for a connection admission method and apparatus that maximizes the use of available bandwidth.

SUMMARY OF THE INVENTION

To overcome the limitations in the prior art described above, and to overcome other limitations that will become apparent upon reading and understanding the present specification, the present invention discloses a knowledge-based connection admission method and apparatus for providing efficient multiplexing of data and speech over AAL2.

The present invention solves the above-described problems by using a knowledge-based technique to decide when and what type of data traffic will be multiplexed with speech traffic in ATM Adaptation Layer 2 (AAL2) environment. The knowledge-based connection technique supports low bit rate and delay sensitive applications such as mobile telephony in an ATM environment by maximizing the use of available bandwidth.

A method in accordance with the principles of the present invention includes monitoring ATM cells for a AAL2 connection, determining whether the ATM cells contain unused bytes and multiplexing data traffic with speech traffic on the AAL2 connection when the data meets a predetermined set of requirements.

Other embodiments of a system in accordance with the principles of the invention may include alternative or optional additional aspects. One such aspect of the present invention is that the multiplexing further includes determining whether the data traffic requires a bandwidth that exceeds a bandwidth provided by the unused bytes and multiplexing the data traffic with the speech traffic when the bandwidth required by the data traffic does not exceeds the bandwidth provided by the unused bytes.

Another aspect of the present invention is that the multiplexing further includes determining whether the data traffic requires a bandwidth that exceeds a bandwidth provided by the unused bytes and preventing the multiplexing of the data traffic with the speech traffic when the bandwidth required by the data traffic exceeds the bandwidth provided by the unused bytes.

Another aspect of the present invention is that the unused bytes represent silence periods during speech traffic.

Another aspect of the present invention is that the multiplexing further includes gathering system observations, processing the system observations with prior knowledge about the system, based upon the processing, determining whether the data traffic is suitable for multiplexing with speech traffic and multiplexing the data and speech traffic when the data traffic is determined to be suitable for multiplexing-with speech traffic.

Another aspect of the present invention is that the determining further includes determining whether a number of users providing speech traffic are fewer than a predetermine number and unused bytes exist in ATM cells of the speech traffic of the users, calculating the percentage of unused bandwidth of the speech traffic and multiplexing an amount of data traffic with the speech traffic in proportion to the unused bandwidth of the speech traffic.

Another aspect of the present invention is that the multiplexing an amount of data traffic further includes determining whether the unused bandwidth is greater than the bandwidth requested by a data connection and admitting the data connection when the unused bandwidth is greater than the bandwidth requested by the data connection.

Another aspect of the present invention is that the multiplexing an amount of data traffic further includes determining whether the unused bandwidth is greater than the bandwidth requested by a data connection and rejecting the data connection when the unused bandwidth is not greater than the bandwidth requested by the data connection.

Another aspect of the present invention is that the method further including updating the prior knowledge about the system after determining whether the data traffic is suitable for multiplexing with speech traffic.

Another aspect of the present invention is that the updating the prior knowledge further includes asserting the number of speech users when the connection from the speech users is accepted, asserting the delay guarantee of the speech users when a change in the delay guarantee of the speech users occurs, asserting the resource allocated for speech users when there is a change in resource allocation for speech users, and asserting the traffic pattern of the speech users when there is a change in the traffic pattern of speech users.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a knowledge-based connection admission method and apparatus for providing efficient multiplexing of data and speech over AAL2. The knowledge-based technique according to the present invention decides when and what type of data traffic will be multiplexed with speech traffic in an ATM Adaptation Layer 2 (AAL2) environment. The knowledge-based connection technique supports low bit rate and delay sensitive applications such as mobile telephony in an ATM environment by maximizing the use of available bandwidth.

Figure 1:
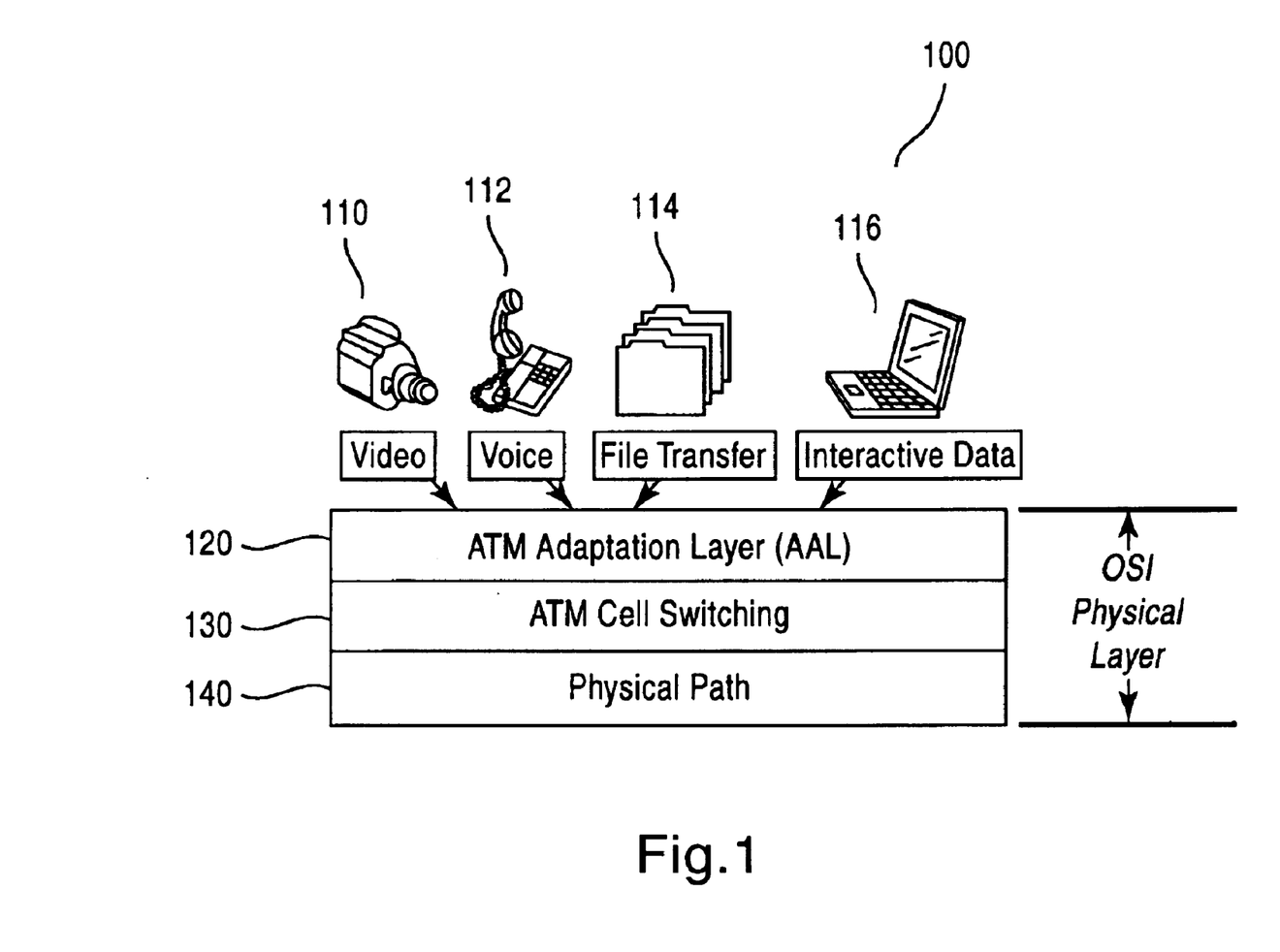
FIG. 1 illustrates the Open Systems Interconnection (OSI) physical layer.

FIG. 1 illustrates the Open Systems Interconnection (OSI) physical layer 100. Modem networks must handle multiple types of traffic such as video 1 10, voice 112, data files 114, and interactive data 116. The ATM Adaptation Layer 120 is a collection of standardized protocols that provide services to higher layers by adapting user traffic to a cell format. The AAL 120 is divided into the Convergence Sublayer (CS) and the Segmentation and Reassembly (SAR) sublayer (not shown). The ATM Layer 130 is the second layer of the ATM protocol stack model 100 that constructs and processes the ATM cells. The functions of the ATM layer 130 also include Usage Parameter Control (UPC) and support of Quality of Service (QoS) classes. Finally, the physical layer 140 is the bottom layer of the ATM protocol reference model 100. The physical layer 140 is subdivided into two sublayers, the Transmission Convergence (TC) and the Physical Medium (PM) (also not shown). The physical layer 140 provides the ATM cells transmitted over the physical interfaces that interconnect ATM devices.

AAL2 is the new ITU-T specification for supporting low bit rate and delay sensitive applications such as mobile telephony in an ATM environment. AAL2 allows many users to share a single ATM connection by effectively packing variable size packets into ATM cells. AAL2 is subdivided into Service Specific Convergence Specific Layer (SSCS) and Common Parts sub-layer (CPS). The CPS layer approved by ITU-T in September 1997, enables variable size packets (0–64 bytes) from different users to be assembled in an ATM cell payload and transmitted on the same ATM Virtual Channel Connection (VCC). In addition, packets are allowed to straddle across an ATM cell boundary to maximize the bandwidth utilization.

Figure 2:
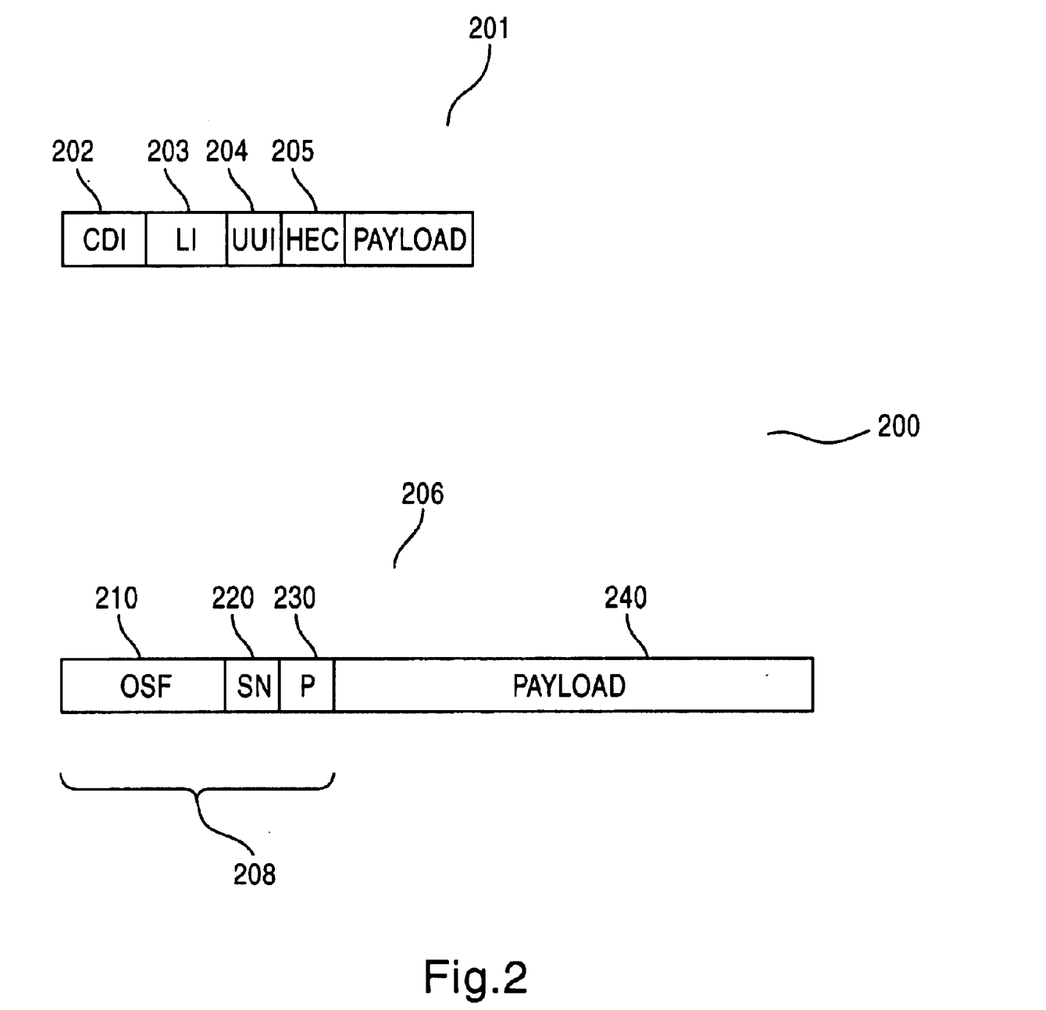
FIG. 2 illustrates the AAL2 packet formats.

FIG. 2 illustrates the AAL2 packet formats 200. In FIG. 2, a CPS-Packet header 201 is 3 bytes long. The CID field 202 is 8 bits long and identifies the Logical Link Control (LLC) for the packet. The Length Indicator (LI) field 203 includes 6 bits and indicates the length of the LLC packet. When the LI field 203 points beyond the end of the current ATM cell, the packet is split between cells. The five bits of the User-To-User Indication Field 204 are identifying user to user information. The Header Error Control (HEC) field 205 includes 5 bits and provides error detection over the packet header.

Also shown in FIG. 2 is a typical Common Parts sublayer packet data unit (CPS-PDU) for ML2 206. The CPS-PDU Start Field (STF) header 208 includes a six bit Offset Field (OSF) 210, a Sequence Number (SN) 220, and a parity bit 230. The STF 208 is one byte in length and occurs at the beginning of every ATM cell payload. As FIG. 2 shows, the Offset Field (OSF) 210 is 6 bits in length. The OSF 210 indicates the remaining length of the packet that (possibly) started in the preceding cell from this ATM connection and is continuing in the current cell. Thus, the OSF 210 points to the start of the first new packet and provides immediate recovery of the packet boundary after an event causing loss of packet delineation. The 1-bit sequence number (SN) field 220 provides a modulo-2 sequence numbering of cells. The one parity (P) bit 230 provides odd parity and covers the STF 208. Then, the payload 240 includes 47 bytes.

Figure 3:
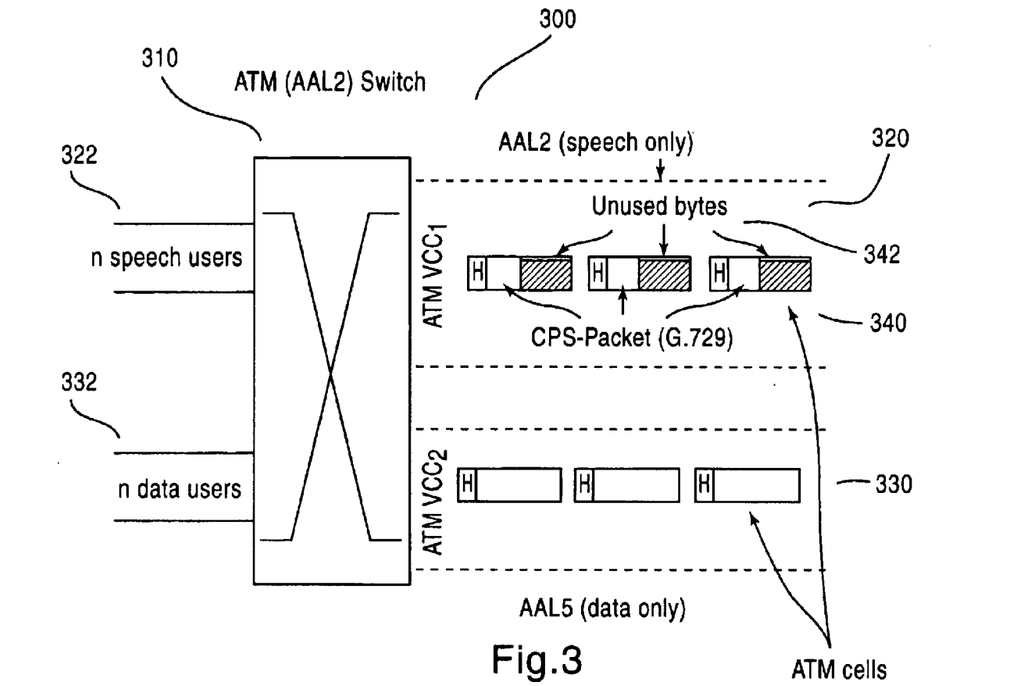
FIG. 3 illustrates a scenario in which speech and best effort data traffic are separated.

FIG. 3 illustrates a scenario 300 in which speech and best effort data traffic are separated. In FIG. 3, the ATM switch 310 provides two VCCs. ATM $VCC_1$ 320 uses AAL2 for speech traffic 322 and ATM $VCC_2$ 330 uses the standard AAL5 for carrying best effort data 332 from a single user. The ATM cells 340 of $VCC_1$ 320 include unused bytes 342. It can be easily concluded from the scenario 300 illustrated in FIG. 3 that if there are not ATM cells to transmit from ATM $VCC_1$ 320 then ATM cells from ATM $VCC_2$ 330 will be transmitted automatically. This is a standard procedure implemented in ATM switches that are available today.

However, as mentioned above, AAL2 introduces a situation where the leftover bandwidth, i.e., the unused bytes 342, in ATM $VCC_1$ 320 could not be used for any best effort data traffic. The main drawback in the scenario 300 illustrated in FIG. 3 is that the ATM cells transmitted via AAL2 $VCC_1$ 320 are only partially filled resulting in inefficient bandwidth utilization.

For example, a number of G.729 (CS-ACELP) speech users share a single ATM VCC (AAL2) and their traffic pattern is in such a way that each packet (10 byte) is filled in a ATM cell and transmitted immediately. The number of useful bytes in an ATM cell are 14 and the rest (34) are unused. A calculation of the bandwidth usage ratio reveals that 64% (34/53) of the bandwidth is wasted, since the left-over bandwidth can not be used by any other traffic that passes through the ATM switch.

Figure 4:
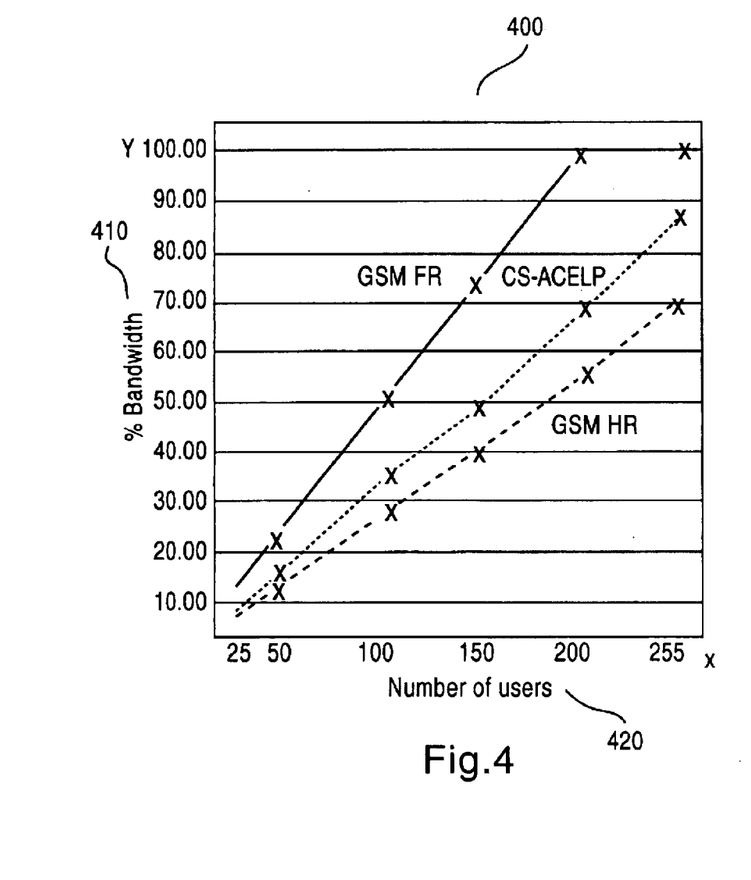
FIG. 4 illustrates the results on actual bandwidth usage in a 2 Mbps link versus the number of users.

Extensive simulation on performance issues related to transporting mobile telephony users over AAL2 are reported by Baranitharan Subbiah and Sudhar Dixit in an article entitled "AAL2 For Low Bit Rate Speech and Data: Issues and Challenges", published in IEEE ATM '98 Workshop, May 1998. FIG. 4 illustrates the results 400 on actual bandwidth usage 410 in a 2 Mbps link versus the number of users 420. The results 400 illustrated in FIG. 4 indicate that the allocated bandwidth for speech users is under utilized when there are fewer users.

Figure 5:
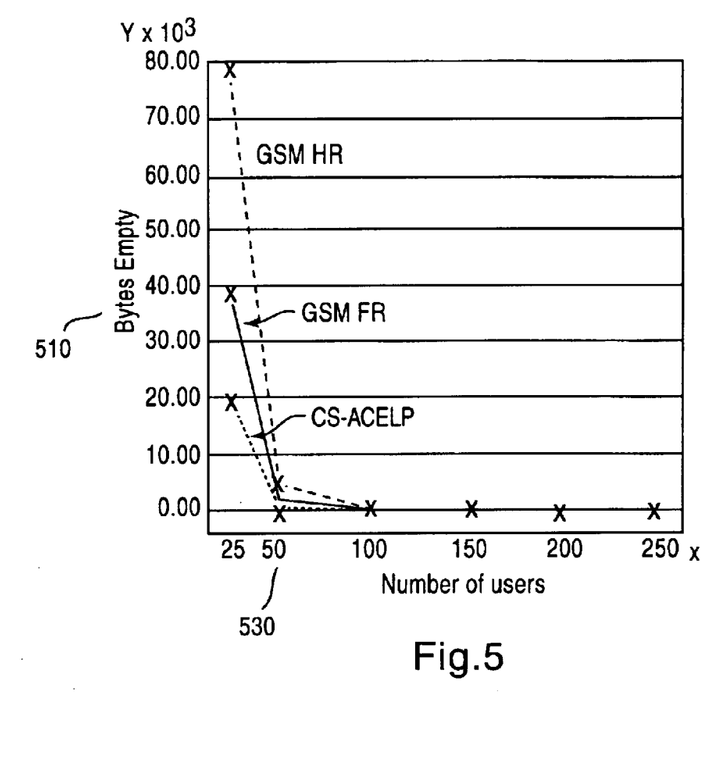
FIG. 5 illustrates the simulation result on the amount of unused bytes.

Also, a simulation result 500 on the amount of unused bytes 510 as shown in FIG. 5 indicate that the number of unused bytes 510 when partial ATM cells are transmitted is much larger when there are fewer than 50 users 530 on the ATM VCC. In addition, Voice Activity Detection (VAD) is a key factor in determining the unused bandwidth. A lower VAD would result in longer silence periods thus increases the amount of unused bandwidth. The results 500 as illustrated in FIG. 5 were obtained with a ratio of 60% to 40% VAD factor. It can be concluded that leftover (unused) bandwidth by speech users depends on the number of speech users, VAD factor and traffic patterns of speech users at the AAL2 multiplexing entity.

In order to improve the overall bandwidth efficiency and to utilize the silence period during speech for best effort data, there is a strong need for an adaptive method and apparatus that monitors various constraints to make an intelligent decision on multiplexing speech and data traffic. At the same time, the method and apparatus should maintain the delay guarantee given to speech users. The present invention maximizes the efficiency of resources allocated for speech users in AAL2 while providing the delay guarantee.

Figure 6:
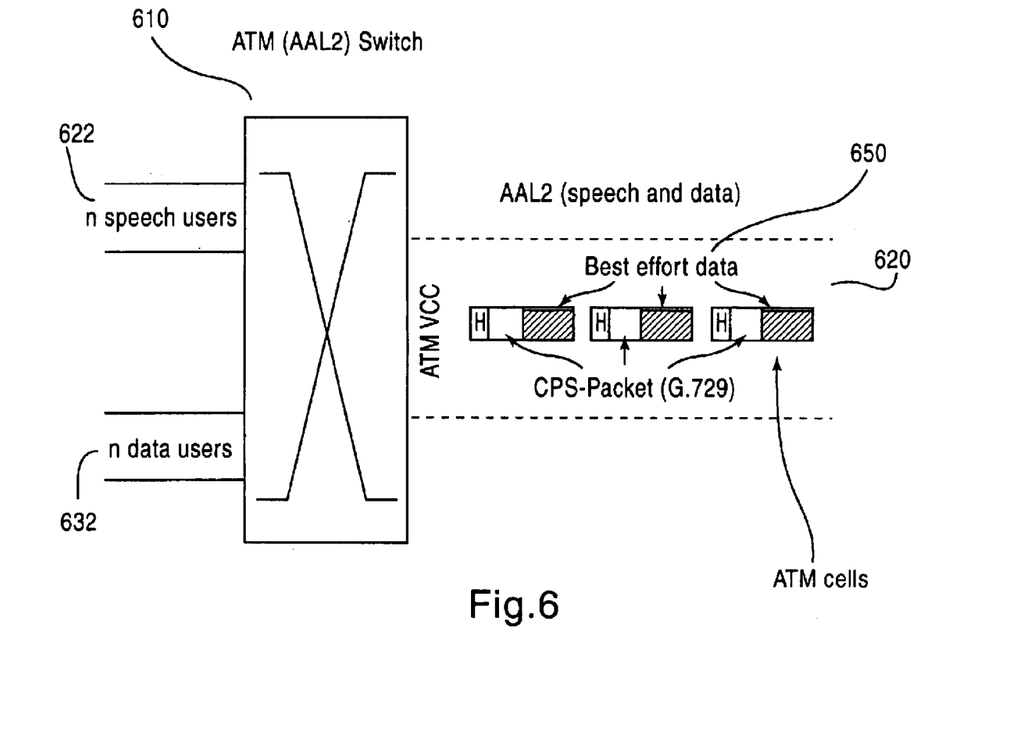
FIG. 6 illustrates how the present invention overcomes the loss of bandwidth due to transmitting partially filled ATM cells.

FIG. 6 illustrates a scenario 600 that maximizes bandwidth efficiency according to the present invention. FIG. 6 discloses an ATM switch 610 that illustrates how the present invention overcomes the loss of bandwidth due to transmitting partially filled ATM cells. In FIG. 6, the ATM switch 610 provides ATM $VCC_1$ 320 that uses AAL2 for speech traffic 322 and for carrying best effort data 332. The previously unused bytes of the ATM cells 640 have been filled, or partially filled, with best effort data 650. Thus, the bandwidth allocated for speech users 622 is utilized to its maximum by transmitting best effort data 632 whenever there is leftover bandwidth.

Nevertheless, as can be seen from the above analysis, multiplexing data traffic over AAL2 involves a complex decision. The key issues that contribute to this complexity are the number of speech users, the allocated resources, the delay guarantee to speech users, the traffic pattern of active speech users and the traffic pattern of data connection request.

The ideal situation for multiplexing data traffic with speech is when there is sufficient amount of leftover bandwidth in the overall allocated bandwidth for speech users. The leftover bandwidth is noticed either when the number of speech users are fewer or traffic distribution at the AAL2 multiplexer is parse (resulting in large number of partial ATM cells). The decision is further complicated due to strict delay requirements of speech users.

The present invention provides a knowledge-based connection method and apparatus that uses the information gathered through self learning for admitting data connection with speech users. This method and apparatus monitors such details as number of users, speech traffic patterns, data connection request and data traffic patterns.

Figure 7:
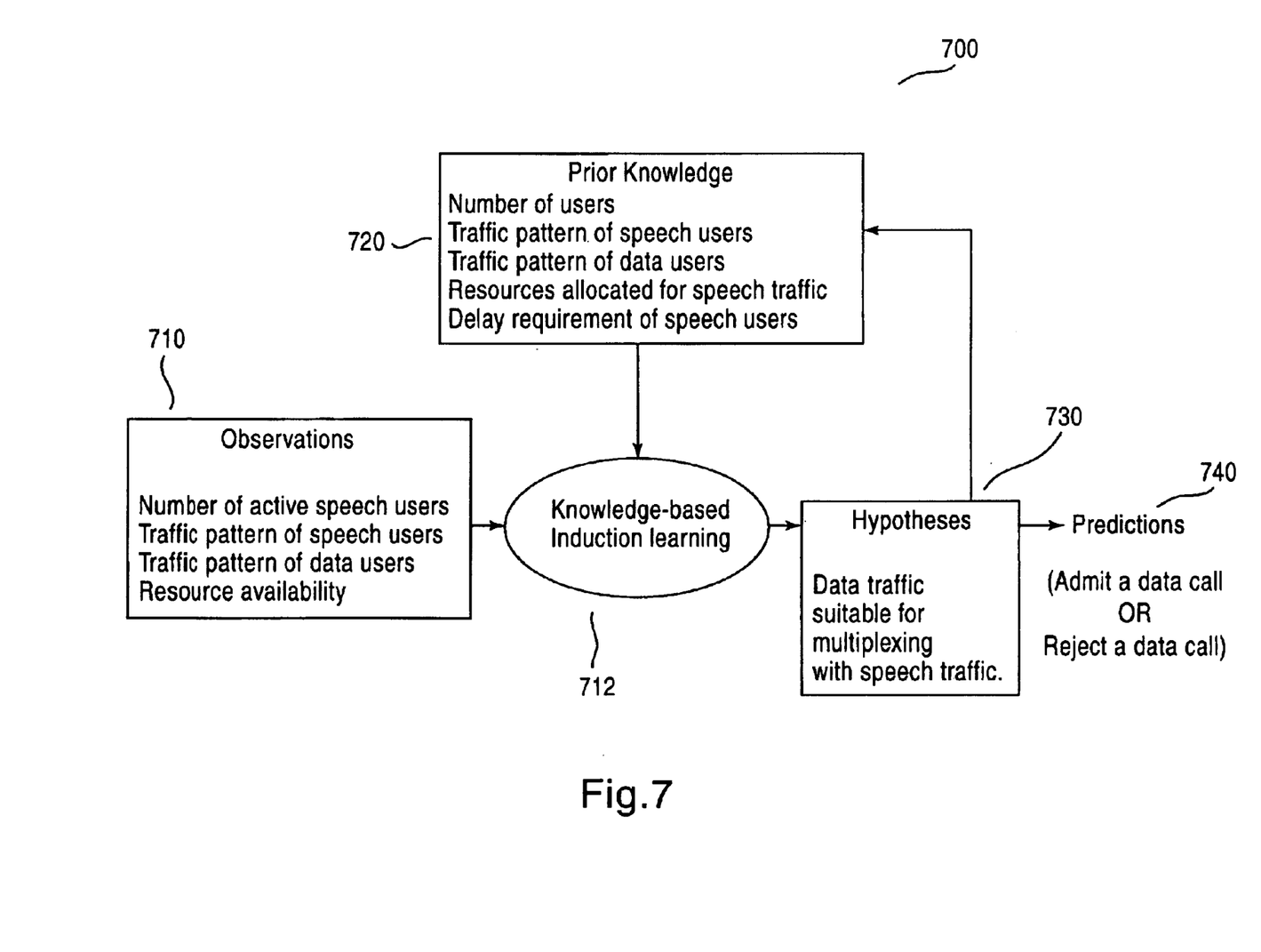
FIG. 7 illustrates a block diagram of the knowledge-based connection apparatus.

FIG. 7 illustrates a block diagram 700 of the knowledge-based connection apparatus. During the observation phase, 710 the knowledge-based connection apparatus 700 monitors the information related to ATM VCCs allocated for speech users. The inductive learning 712 is an iterative process by which the knowledge-based connection apparatus 700 updates its prior knowledge 720, i.e., its knowledge of traffic parameters in a AAL2 connection.

Whenever a new data connection request is received, the knowledge-based connection apparatus 700 tries to prove the hypotheses 730 that data traffic is suitable for multiplexing with speech. During the decision process, the knowledge base is used for connection admittance. The knowledge-based induction learning 712 processes observations 710 on the number of active speech users, the traffic pattern of speech users, the traffic pattern of data users and resource availability with prior knowledge 720 such as the number of active speech users, the traffic pattern of speech users at the AAL2 multiplex entity, the traffic pattern of data users (data rate/best effort/ABR etc), the resources allocated for speech users (BW, QoS etc), and the delay requirement of speech users to attempt prove the hypotheses 730 that data traffic is suitable for multiplexing with speech and to make a prediction 740 that is used to admit or reject a data cell.

The knowledge-based induction learning 712 uses decision rules as explained herein. However, those skilled in the art will recognize that the decision rules described herein are not meant to limit the invention, but are presented for illustration only. Other decision rules in accordance with the teaching of the present invention are possible.

The first decision rule is if the number of users are fewer than a predetermined number, e.g., 50, and their traffic pattern results in partial ATM cells, then calculate the percentage of unused bandwidth and assert the leftover bandwidth. The second decision rule is if the unused bandwidth is greater than the bandwidth requested by a data connection, then admit the call through AAL2. The third decision rule is if the second decision rule fails, then reject the data connection through AAL2 and admit through AAL5.

Knowledge update rules are also implemented. Likewise, those skilled in the art will recognize that the knowledge rules described herein are not meant to limit the invention, but are presented for illustration only. Other knowledge rules in accordance with the teaching of the present invention are possible. The first knowledge rule is that if the connection from the speech users is accepted, then the number of speech users is asserted. The second knowledge rule is that if there is a change in the delay guarantee of the speech users, the delay guarantee of the speech users is asserted. The third knowledge rule is if there is a change in resource allocation for speech users, assert the resource allocated for speech users. The fourth knowledge rule is that if there is a change in the traffic pattern of speech users, the traffic pattern of the speech users is asserted.

One of the limitations in multiplexing any arbitrary data traffic request with speech is keeping the delay requirement to speech users at an acceptable level. The knowledge-based connection method and apparatus solves this problem by monitoring the leftover bandwidth by speech users and bandwidth request of a new data connection. A new data connection is admitted only if it meets a set of requirements that stipulates data traffic for multiplexing with speech traffic. If the bandwidth request of the new data connection exceeds the leftover bandwidth or it requires strict delay guarantees then the connection request is either denied or accepted through AAL5. The knowledge-based connection method and apparatus is not a replacement for standard CAC method and apparatus implemented in current ATM switches. The knowledge-based connection method and apparatus is used mainly for AAL2 type connections in conjunction with the standard CAC method and apparatus.

Multiplexing data traffic along with speech has advantages such as efficient use of silence period during speech and less complexity involved in setting up individual ATM (AAL5) VCC for data users. Multiplexing data with speech is efficient when there are fewer speech users and a traffic pattern that result in large number of partially transmitted ATM cells. The key advantage of using knowledge-based techniques in CAC method and apparatus is that the decision making process is highly adaptive to the ever-changing network traffic. An method and apparatus that is used for decision making should include all possible scenarios that could happen in a network and at the same time able to adopt itself to the changing network characteristics. Since the decision process in AAL2 multiplexing is more complex than statistical multiplexing, the intelligent method and apparatus approach based on self learning is needed.

Figure 8:
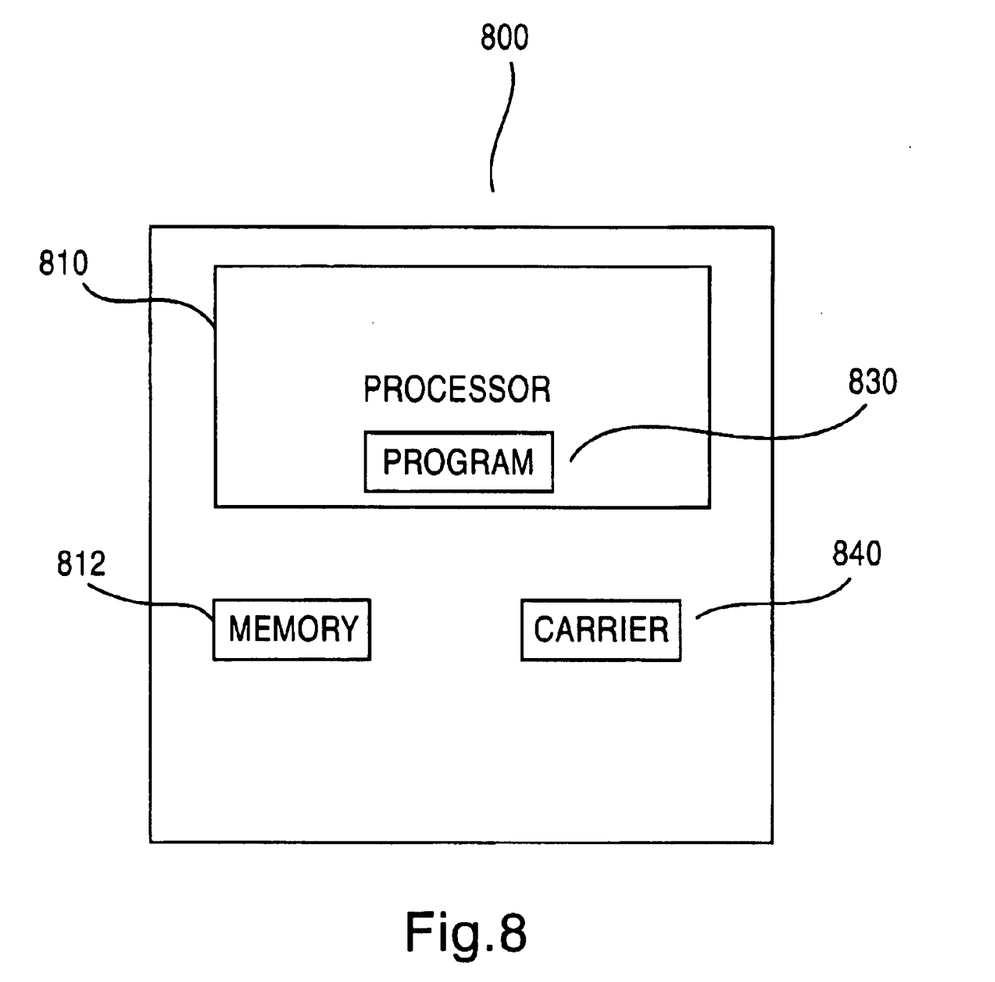
FIG. 8 illustrates a block diagram of a hardware implementation 800 of the present invention.

FIG. 8 illustrates a block diagram of a hardware implementation 800 of the present invention. A switch according to the present invention, such as illustrated in FIG. 6, include a processor 810 and memory 812 which may include random access memory (RAM), read-only memory (ROM), or any other memory configuration. The processor 810 operates under the control of an operating system (not shown) and is configured to executes one or more computer programs implementing the knowledge-based connection method and apparatus, which are represented in FIG. 8 by the "box" 830 within the block indicating the processor 810. Generally, the computer programs 830 may be tangibly embodied in a computer-readable medium or carrier 840. The computer programs 830 may be loaded from the computer-readable medium or carrier 840 into memory 812 for execution by the processor 810 as discussed above with reference to FIGS. 6 and 7. The computer program 830 comprises instructions which, when read and executed by the processor 810, causes the processor 810 to perform the steps necessary to execute the steps or elements of the present invention. Although an exemplary computer system configuration is illustrated in FIG. 8, those skilled in the art will recognize that any number of different configurations performing similar functions may be used in accordance with the present invention.

In summary, the present invention handles connection admission procedures for data calls in an AAL2 environment. The present invention uses the knowledge-based techniques to decide what type of data connection will be admitted and under what conditions. Mobile applications such as SMS, WWW and email, which have been identified as best effort data services in a wireless environment, require very low data rates especially in a wireless environment. This makes these types of applications a good choice for multiplexing with speech during silence periods. The present invention enables the bandwidth allocated for speech traffic in a ATM VCC be used to its maximum capacity by admitting data calls that are strictly within the left-over bandwidth by speech users. Accordingly, the present invention uses self-learning methods to update its local knowledge such as the number of speech users, speech traffic distribution (resulting in partial ATM cells), delay requirement of speech users and traffic characteristics of the new data connection. Whenever a request for data connection is received, the knowledge-based connection method and apparatus uses the knowledge it gathered so far to make a decision on whether to accept or reject the request. While improving the bandwidth efficiency by effectively using the left-over bandwidth by speech users, this method and apparatus does not compromise the delay requirement of speech users at any time. In addition, the bandwidth leftover due to silence in speech is utilized for best-effort data thus achieving maximum bandwidth efficiency.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for adding data traffic to speech traffic so that the bandwidth of AAL2 connections are maximized, comprising:

monitoring speech data to be incorporated into ATM cells for a AAL2 connection;

determining whether the ATM cells will contain unused bytes;

adding data traffic to speech traffic on the AAL2 connection in the unused bytes when the speech traffic meets a predetermined set of requirements for the speech traffic.

2. The method of claim 1 wherein the adding step further comprises determining whether the data traffic requires a bandwidth that exceeds a bandwidth provided by the unused bytes and adding the data traffic to the speech traffic when the bandwidth required by the data traffic does not exceeds the bandwidth provided by the unused bytes.

3. The method of claim 1 wherein the adding step further comprises determining whether the data traffic requires a bandwidth that exceeds a bandwidth provided by the unused bytes and preventing the adding of the data traffic to the speech traffic when the bandwidth required by the data traffic exceeds the bandwidth provided by the unused bytes.

4. The method of claim 1 wherein the unused bytes represent silence periods during speech traffic.

5. The method of claim 1 wherein the adding step further comprises:

gathering system observations;

processing the system observations with prior knowledge about the system;

based upon the processing, determining whether the data traffic is permitted for multiplexing with speech traffic; and adding the data to the speech traffic when the data traffic is determined to be permitted for inclusion with speech traffic.

6. The method of claim 5 wherein the determining further comprises:

determining whether a number of users providing speech traffic are fewer than a predetermine number and unused bytes exist in ATM cells of the speech traffic of the users;

calculating the percentage of unused bandwidth of the speech traffic; and adding an amount of data traffic to the speech traffic in proportion to the unused bandwidth of the speech traffic.

7. The method of claim 6 wherein the adding an amount of data traffic further comprises:

determining whether the unused bandwidth is greater than the bandwidth requested by a data connection; and admitting the data connection when the unused bandwidth is greater than the bandwidth requested by the data connection.

8. The method of claim 6 wherein the adding an amount of data traffic further comprises:

determining whether the unused bandwidth is greater than the bandwidth requested by a data connection; and rejecting the data connection when the unused bandwidth is not greater than the bandwidth requested by the data connection.

9. The method of claim 5 further comprising updating the prior knowledge about the system after determining whether the data traffic is permitted for addition to speech traffic.

10. The method of claim 9 wherein the updating the prior knowledge further comprises:

asserting the number of speech users when the connection from the speech users is accepted;

asserting the delay guarantee of the speech users when a change in the delay guarantee of the speech users occurs;

asserting the resource allocated for speech users when there is a change in resource allocation for speech users; and asserting the traffic pattern of the speech users when there is a change in the traffic pattern of speech users.

11. A method for adding data traffic to speech traffic so that the bandwidth of AAL2 connections are maximized, comprising:

monitoring speech data to be incorporated into ATM cells for a AAL2 connection;

determining whether the monitored ATM cells will contain unused bytes;

gathering system observations;

processing the system observations with prior knowledge about the system;

based upon the processing the system observations with prior knowledge about the system and determining whether the ATM cells contain unused bytes, determining whether the data traffic is permitted for inclusion with speech traffic; and adding the data to the speech traffic in the unused bytes when the data traffic is determined to be permitted for inclusion with speech traffic.

12. The method of claim 11 wherein the determining further comprises:

determining whether a number of users providing speech traffic are fewer than a predetermine number and unused bytes exist in ATM cells of the speech traffic of the users;

calculating the percentage of unused bandwidth of the speech traffic; and adding an amount of data traffic to the speech traffic in proportion to the unused bandwidth of the speech traffic.

13. The method of claim 12 wherein the adding an amount of data traffic step further comprises:
determining whether the unused bandwidth is greater than the bandwidth requested by a data connection; and
admitting the data connection when the unused bandwidth is greater than the bandwidth requested by the data connection.

14. The method of claim 12 wherein the adding an amount of data traffic step further comprises:
determining whether the unused bandwidth is greater than the bandwidth requested by a data connection; and
rejecting the data connection when the unused bandwidth is not greater than the bandwidth requested by the data connection.

15. The method of claim 11 further comprising updating the prior knowledge about the system after determining whether the data traffic is permitted for addition to speech traffic.

16. The method of claim 15 wherein the updating the prior knowledge further comprises:
asserting the number of speech users when the connection from the speech users is accepted;
asserting the delay guarantee of the speech users when a change in the delay guarantee of the speech users occurs;
asserting the resource allocated for speech users when there is a change in resource allocation for speech users; and
asserting the traffic pattern of the speech users when there is a change in the traffic pattern of speech users.

17. The method of claim 11 wherein the adding step further comprises determining whether the data traffic requires a bandwidth that exceeds a bandwidth provided by the unused bytes and adding the data traffic to the speech traffic when the bandwidth required by the data traffic does not exceeds the bandwidth provided by the unused bytes.

18. The method of claim 11 wherein the adding step further comprises determining whether the data traffic requires a bandwidth that exceeds a bandwidth provided by the unused bytes and preventing the adding of the data traffic to the speech traffic when the bandwidth required by the data traffic exceeds the bandwidth provided by the unused bytes.

19. The method of claim 11 wherein the unused bytes represent silence periods during speech traffic.

20. An article of manufacture for a processor-based AAL2 switch, the article of manufacture comprising a computer readable medium having instructions for causing a processor to perform a knowledge-based connection method comprising:
monitoring speech data to be incorporated into ATM cells for a AAL2 connection;
determining whether the ATM cells will contain unused bytes;
adding data traffic to speech traffic on the AAL2 connection in the unused bytes when the speech traffic meets a predetermined set of requirements for the speech traffic.

21. The article of manufacture of claim 20 wherein the adding further comprises determining whether the data traffic requires a bandwidth that exceeds a bandwidth provided by the unused bytes and adding the data traffic to the speech traffic when the bandwidth required by the data traffic does not exceeds the bandwidth provided by the unused bytes.

22. The article of manufacture of claim 20 wherein the adding further comprises determining whether the data traffic requires a bandwidth that exceeds a bandwidth provided by the unused bytes and preventing the adding of the data traffic to the speech traffic when the bandwidth required by the data traffic exceeds the bandwidth provided by the unused bytes.

23. The article of manufacture of claim 20 wherein the unused bytes represent silence periods during speech traffic.

24. The article of manufacture of claim 20 wherein the adding further comprises:
gathering system observations;
processing the system observations with prior knowledge about the system;
based upon the processing, determining whether the data traffic is suitable for adding to speech traffic; and
including the data and speech traffic when the data traffic is determined to be suitable for addition to speech traffic.

25. The article of manufacture of claim 20 wherein the determining further comprises:
determining whether a number of users providing speech traffic are fewer than a predetermine number and unused bytes exist in ATM cells of the speech traffic of the users;
calculating the percentage of unused bandwidth of the speech traffic; and
adding an amount of data traffic to the speech traffic in proportion to the unused bandwidth of the speech traffic.

26. The article of manufacture of claim 25 wherein the adding an amount of data traffic further comprises:
determining whether the unused bandwidth is greater than the bandwidth requested by a data connection; and
admitting the data connection when the unused bandwidth is greater than the bandwidth requested by the data connection.

27. The article of manufacture of claim 25 wherein the adding an amount of data traffic further comprises:
determining whether the unused bandwidth is greater than the bandwidth requested by a data connection; and
rejecting the data connection when the unused bandwidth is not greater than the bandwidth requested by the data connection.

28. The article of manufacture of claim 24 further comprising updating the prior knowledge about the system after determining whether the data traffic is permitted for addition to speech traffic.

29. The article of manufacture of claim 28 wherein the updating the prior knowledge further comprises:
asserting the number of speech users when the connection from the speech users is accepted;
asserting the delay guarantee of the speech users when a change in the delay guarantee of the speech users occurs;
asserting the resource allocated for speech users when there is a change in resource allocation for speech users; and
asserting the traffic pattern of the speech users when there is a change in the traffic pattern of speech users.

30. An AAL2 switch for adding data traffic to speech traffic through an AAL2 connection, comprising:
a memory for storing observation knowledge and prior knowledge; and an AAL2 management entity coupled to the memory for processing the observation knowledge and the prior knowledge, wherein the AAL2 management entity monitors speech data to be incorporated into ATM cells of a AAL2 connection, determines whether the ATM cells will contain unused bytes, and adds data traffic to speech traffic on the AAL2 connection in the unused bytes when the speech traffic meets a predetermined set of requirements for the speech traffic.

31. The AAL2 switch of claim 30 wherein the management entity determines whether the data traffic requires a bandwidth that exceeds a bandwidth provided by the unused bytes and adds the data traffic to the speech traffic when the bandwidth required by the data traffic does not exceeds the bandwidth provided by the unused bytes.

32. The AAL2 switch of claim 30 wherein the management entity determines whether the data traffic requires a bandwidth that exceeds a bandwidth provided by the unused bytes and prevents the adding of the data traffic to the speech traffic when the bandwidth required by the data traffic exceeds the bandwidth provided by the unused bytes.

33. The AAL2 switch of claim 30 wherein the unused bytes represent silence periods during speech traffic.

34. The AAL2 switch of claim 30 wherein the management entity gathers system observations and updates prior knowledge for storage in the memory, the management entity processing the system observations with prior knowledge about the system, determines whether the data traffic is permitted for adding to speech traffic based upon the processing, and adds the data to speech traffic when the data traffic is determined to be permitted for adding to speech traffic.

35. A knowledge-based connection entity, comprising:

observation knowledge stored in memory;

prior knowledge stored in memory; and a processor for deciding when data traffic can be added to speech traffic based upon the observation knowledge and prior knowledge wherein the processor processes the observation knowledge and the prior knowledge to determine whether the data traffic requires a bandwidth that exceeds a bandwidth provided by unused bytes in ATM cells carrying the speech traffic and adds the data traffic to the speech traffic when the bandwidth required by the data traffic does not exceeds the bandwidth provided by the unused bytes.

* * * * *